A. O. TRAVIS.
MACHINE FOR MANUFACTURING GELATIN SHEETS OR FILMS.
APPLICATION FILED OCT. 30, 1916.
1,310,311.
Patented July 15, 1919.
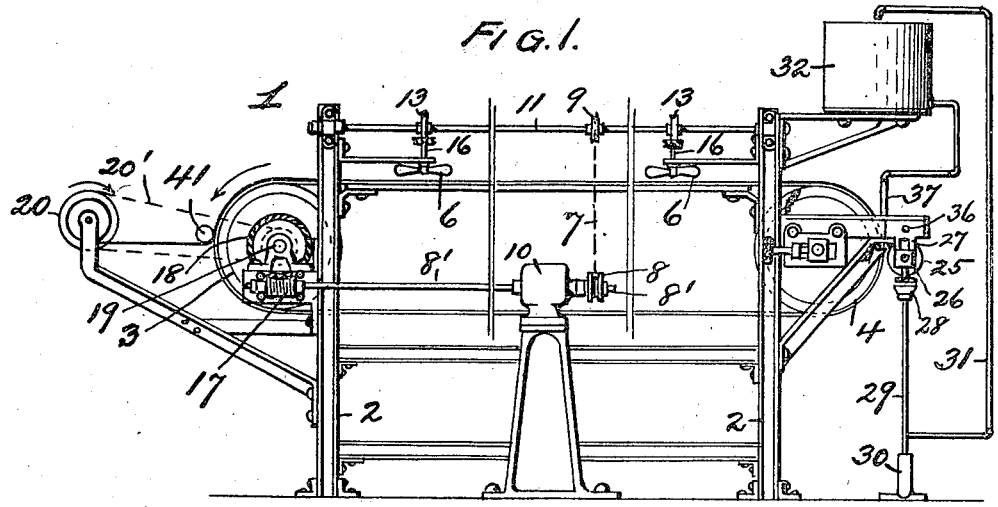

UNITED STATES PATENT OFFICE.

ASHER O. TRAVIS, OF DEL RAY, VIRGINIA, ASSIGNOR TO HENRY M. CONGER, OF WASHINGTON, DISTRICT OF COLUMBIA.

MACHINE FOR MANUFACTURING GELATIN SHEETS OR FILMS.

1,310,311. Specification of Letters Patent. Patented July 15, 1919.

Application filed October 30, 1916. Serial No. 128,513.

*To all whom it may concern:*

Be it known that I, ASHER O. TRAVIS, a citizen of the United States, residing at Del Ray, in the county of Alexandria and State of Virginia, have invented certain new and useful Improvements in Machines for Manufacturing Gelatin Sheets or Films, of which the following is a specification.

My invention relates to a machine for manufacturing gelatin sheets or films intended for various purposes, and it relates more particularly to a spreading device adapted to effect the spreading of the gelatinous material onto the traveling conveyer or receiving surface.

Among the objects in view is to provide an extremely simple, inexpensive, and efficient spreading device adapted to produce sheets or films of gelatin or the like and by the use of which device the liability of the gelatinous substance to adhere to the conveyer or receiving surface with the attendant waste of material, loss of time and expense are entirely avoided.

A further object of the invention is to provide a spreading device as described whereby sheets or films may be produced having an even texture, tensile strength and thickness, and whereby an even distribution of the gelatinous material will be assured, as well as perfect removability of the sheet or film from the surface of the conveyer after such sheet or film is dried.

A further object of the invention is to obviate the necessity of lubricating the surface of the conveyer, thus effecting a saving in time and expense, the only requirement being that the surface of the conveyer be kept clean and highly polished.

A further object of the invention is to avoid the formation of air bubbles or similar imperfections in the sheet or film as heretofore produced and produce instead a perfect sheet or film.

Other objects and advantages of the present invention will appear from the following description when taken in connection with the accompanying drawings.

The invention consists in the novel construction, arrangement and combinations of parts as hereinafter fully described, illustrated in the drawings and pointed out in the appended claims.

In the drawings:

Figure 1 is a side elevation of a machine for producing gelatinous sheets or films having my invention applied thereto.

Fig. 2 is a rear elevation thereof.

Fig. 3 is an enlarged detail view, partly in section, of a portion of the spreading device, illustrating the manner of forming the pool of gelatinous material and the mode of transferring the same onto the receiving surface.

Fig. 4 is an enlarged detail view illustrating the manner of supporting and adjusting the spreading device.

Fig. 5 is a detail perspective view illustrating a slightly modified construction of the spreading device.

Fig. 6 is a sectional view of the spreading plate shown in Fig. 5.

In the manufacture of gelatin sheets or films as heretofore proposed great difficulty has been experienced in removing the dried sheet or film from the receiving surface, and, furthermore, the sheet or film is often of varying thickness, lacks even tensile strength, and often contains numerous air bubbles, all of which are due to the manner in which the semi-fluid gelatinous material is transferred onto the receiving surface. By my invention I overcome the recited disadvantages and produce a perfect product and also increase the output of the machine and effect economy.

I will first describe in a general way a machine to which my invention is applicable, said machine not differing in its general character from machines heretofore used in the manufacture of gelatinous sheets or films, and in Figs. 1 to 4 of the drawings, 1 indicates a machine of known construction, embodying a supporting frame-work 2 in which at opposite ends are mounted drums 3 and 4, the latter being horizontally adjustable, and over which drums travels an endless conveyer or receiving surface, such as a belt or apron 5.

A series of drying fans 6 are suitably supported above the upper run of the conveyer and are driven by suitable gearing, as for instance belts 7 running over pulleys 8 and 9 mounted respectively on the shaft 8' of an electric motor 10 and a shaft 11 carried by the frame-work, the latter shaft also carrying pulleys 12 over which run belts 13 which latter run around pulleys 14 on the vertical fan shafts 16.

Movement of the conveyer belt is obtained by suitable gearing from the electric motor, as for instance a worm 17 on the shaft 8' meshing with a worm wheel 18 on the shaft 19 of the drum 3. A drum or roll 20 is provided upon which the dried film is wound as it is stripped from the drum 3.

The roll 20 is driven by a belt 20' from the shaft 19. 41 is a roller arranged adjacent the drum 3 and around which the dried film passes in its movement toward the receiving roll 20.

The machine as thus far described is of ordinary construction and forms no part of my present invention, which latter I will now proceed to describe in detail.

25 indicates a non-rotatable roll supported by a shaft 26 held fixedly in suitable supports, as for instance bearing blocks 26' mounted in slots 27' formed in hangers 28' carried by the framework of the machine. The roll 25 is covered preferably with soft rubber and said roll is arranged in such position relatively to the surface of the drum 4 that it will form a joint, trough or pocket in conjunction with said surface to receive a supply of the semi-fluid gelatinous material or emulsion, whereby a pool of the latter will be constantly maintained in said trough or pocket during the operation of the machine. I have found that the relative arrangement of the roll 25 and the conveyer where it passes around the drum 4 is of the utmost importance as it enables me to overcome the objections heretofore encountered in machines of this character.

I have found that by arranging the roll 25 at a point coincident or substantially coincident with the horizontal diametrical plane of the drum 4, the pool of gelatinous material will be subjected to a strong vertical gravital pull, so that when the drum 4 is rotated in the direction of the arrow in Fig. 3, the movement of the conveyer belt will be in a direction opposite to said gravital pull, i. e., opposite to that in which the force of gravity is most strongly exerted upon the gelatinous material contained in the trough, and causes said material to be taken up and distributed evenly over the entire width of the belt, provided of course the length of the spreading roll corresponds to such width. By using spreading rolls of varying lengths the gelatinous material will be spread upon the belt correspondingly whereby sheets or films of varying widths will be produced.

While I prefer the above described location of the spreading device relatively to the drum, or rather the belt where it passes around said drum, yet such location may be varied within certain limits and yet produce the same or practically the same results.

It will be found that by transferring the material onto the receiving surface as described, the formation of air bubbles in the material upon the belt will be avoided and there will be no pressure exerted upon the material as it is being taken up by the belt which would have a tendency to cause the material to adhere tightly to the belt, and prevent ready removal of the dried sheet or film.

In practice the gelatinous emulsion is to be supplied constantly to the trough or pocket and in such quantity that there will always be an excess above what is taken up by the belt in its movement. In order to make sure of the supply being sufficient and obtain practically automatic conditions, I feed the emulsion in such quantity as to form an overflow which will flow around the circumferential surface of the spreading roll and drop by gravity into a funnel 28 carried by a pipe 29, whence it is pumped by a pump 30 through pipe 31 back to the emulsion supply-tank or reservoir 32.

In practice I have found that the periphery of the roll 25 should be always maintained in light contact with the belt or other receiving surface so as to form a joint, and in order that the proper relation may be automatically maintained, I so mount the roll 25 that it may be adjusted vertically in its support and also may have a pivotal or swinging movement toward and from the drum or receiving surface. The vertical adjustment and pivotal movement may be obtained in any suitable manner, as for instance by mounting the bearing blocks 26' slidingly in the slots 27', and which blocks are adapted to be adjusted vertically by adjusting screws 35 working in the hangers 28'. The latter are pivotally mounted on the frame-work by means of pivot bolts 36 which latter engage the frame-work at such points that the periphery of the roll will hang in light but yielding contact with the receiving surface of the belt, as shown in Fig. 3.

The gelatinous emulsion may be fed to the trough intermediate the roll 25 and the belt in any suitable manner and at one or more points if desired, and I show the material as being fed by a single supply pipe 37 leading from the reservoir 32 and provided with a regulating cock 38. As the belt moves in the direction of the arrow in Fig. 3, it takes up the proper quantity of the material, which latter adheres to the belt in the form of an extremely thin film or sheet, as indicated at 40, and is carried around with the belt until it reaches the opposite end of the machine, it meanwhile being subjected to the drying action of the fans, so that it will be fully dried by the time it reaches the drum 3. Arriving at that point the end of the dried film is readily freed from the belt and led around the roller 41, and thence around roll 20, and it will continue to be wound around the latter roll as long as the machine continues in operation.

The rate of movement of the conveyer belt is so regulated that sufficient time will be allowed for the film to become dried in its passage from the spreading device to the drum 3.

Any suitable soft, resilient, liquid-non-conducting substance as soft rubber may be used for the covering of the roll 25. After continued use of the device the roll 25 will become dirty at the point of contact with the drum 4 or the belt, and, in such event, by turning the roll 25 around a fraction of a turn a fresh and clean surface will be presented to the belt and in this way I attain an advantage in my device over prior devices.

The belt may be made of any desired non-porous material capable of a high polish, such as copper or aluminum, the former being preferable, and the same is kept in a clean and highly polished condition so as to obviate any liability of the gelatinous material adhering tightly to the surface.

I have found that owing to the particular manner in which the gelatinous material is spread upon the belt it is not necessary to keep the surface of the latter in a lubricated condition as heretofore has been necessary, the only requirement being that its receiving surface be kept clean and highly polished.

Instead of using a spreading device in the form of a roll, as indicated in Figs. 1 to 4, I may use a device in the form of a flat plate or board covered with the soft rubber as 42' at the point of contact with the belt, and in Figs. 5 and 6 I show such a spreading device. The plate 41 is arranged relatively to the drum 4 so as to form a joint, trough, or pocket similarly to the roll 25, and I have found that this modified construction of spreading device enables me to obtain results the equal of those obtained by the use of the roll 25. The plate is to be adjustably and pivotally supported by means similar to those provided for the roll 25 so that said plate may be brought into the proper position relatively to the receiving surface of the belt to insure the proper contact therewith.

For the purpose of carrying off the overflow of the gelatinous material when the plate or board 41 is used, I provide suitable conducting strips 41' preferably slightly curved, arranged one at each end of the plate, one end of the strips 41' being secured to the plate 41 so that the overflow may follow along the outer surface of the strips 41' and be conducted thereby into the funnel 28 shown in Figs. 1, 2, and 3.

I have found that the flow of the gelatinous material into the pocket or trough causes an agitation of the material which keeps the elements thereof properly mixed. In the event of the elements not being kept properly mixed the mucilaginous element would be apt to exert its greater property of adherence upon the surface of the belt and stick thereto so tightly as to prevent the free stripping of the dried film from the belt.

In other processes or machines where a pool of the emulsion is maintained and removed from said pool by passing through it a conveying surface which in turn by coming in contact with the surface to be spread applies said emulsion, there is a tendency for the receiving surface of the belt to take up the more glutinous or mucilaginous element of the emulsion on account of the viscosity before the thinner and more inferior elements in the emulsion will take up. This condition continues until the pool becomes charged with the poorer elements (leucin) which have to pass off, giving a much thinner and inferior film and generally causing strong adherence to the surface being spread, often necessitating washing in order to remove it.

In my device there is a thorough and continuous agitation of the emulsion while exposed to the surface being spread, thereby assuring even texture, tensile strength, thickness, and what is equally important on account of the thorough and even distribution of the gelatinous materials it insures perfect removability of the dried film from the surface which is spread.

I wish to state that the adjustment and pivotal arrangement of the spreading device, as well as the arrangement of same relatively to the receiving surface, are of vital importance to the attainment of the objects hereinbefore set forth. I have already stated that the present machine is intended to produce gelatin sheets or films of extreme thinness. In fact, the sheets which I produce in practice approximate one one-thousandth of an inch in thickness. In order to obtain such extreme thinness it is absolutely necessary to provide for an extreme nicety of adjustment of the spreading device relatively to the receiving surface in order that the contact between the two may be made as exact as possible in order to produce the desired result, and at the same time avoid too close a contact which would be detrimental.

The use of a spreading device open at the ends in contradistinction to a spreading device which is closed at the ends is also of vital importance. Where a closed-end spreader is used, as heretofore, it is impossible to produce a film which is clean-cut and uniform at the edges and of the same thickness throughout the entire width of the sheet or film. When ends are provided on the spreader such ends cause uneven and smeared edges on the film, due to the ends dragging through the emulsion. This is caused whether there be a perfect joint or not between the spreader and the receiving surface, and, furthermore, sticking of the film, torn edges, etc., are produced.

In practice nothing should touch the surface being spread after such surface contacts with the emulsion. Therefore, to avoid the recited difficulties I provide the overflow, which possesses these advantages: straight and uniform edges, even thickness for the entire width of the film, perfect removability thereof, and possibility of maintaining uniform supply of the emulsion.

It has been suggested heretofore in machines of the present character to provide for a feeding of the emulsion in quantities that would be regulated so as to be just equal to the amount required and maintaining this condition, but in practice it would be physically impossible to do this. For instance, the supply required for making a spread about two feet in width, which is about the maximum required, would be about one sixteenth of an inch in thickness; this with a pressure of a three-foot head; the more pressure from the source or reservoir of course the smaller the stream and the smaller the size of the port in the regulating valve with greater chances of clogging.

In constructing a machine of the present character to produce gelatin sheets of the extreme thinness heretofore referred to, it is practically impossible to construct the traveling receiving surface so as to be perfectly true, or in other words that will present exactly the same position relatively to the spreading device at all times, and here is where the provision of means for adjusting the spreading device to attain the desired light contact, and the provision of the swinging movement of the spreading device are found to be highly desirable, in fact absolutely necessary to attain the desired excellent results.

Were no adjustment provided for the spreading device it would be impossible to secure the proper relative relation of the said device and the receiving surface and consequently the product would vary in character. Furthermore where a machine has been used for some time and wear has occurred the thickness of the film would be affected.

The pivotal arrangement of the spreader permits the latter to yield slightly where inequalities in the receiving surface or slight change in position of same are encountered while the machine is running. Were no such pivotal arrangement provided it can readily be seen that there would result uneven thickness at different points in the film.

While I have herein described the receiving or conveying surface as being constituted by a belt or apron it will be understood that I am not to be restricted to any specific construction of the receiving surface. Any moving surface may constitute the receiving device or element, as for instance a rotatable drum upon the circumferential surface of which the gelatinous material may be applied, and said drum may be made of glass or similar vitreous material, or covered with a suitable metal as copper or aluminum and said drum would serve the same purpose as the belt hereinbefore described.

What I claim and desire to secure by Letters Patent is:

1. In a machine of the character described, the combination with a movable member having a receiving surface for gelatinous material, of an open ended spreading device comprising a roll arranged to form a trough or pocket extending longitudinally between it and said surface, said roll being pivotally supported to adapt it to have a movement toward and from the receiving surface.

2. In a machine of the character described, the combination with a movable member having a receiving surface for gelatinous material, of an open ended spreading device arranged to form a trough or pocket between it and the said receiving surface, a reservoir for gelatinous material, means for feeding the latter into the trough, a receptacle arranged below the spreading device to receive the overflow, and means for returning the latter to the reservoir.

3. In a machine of the character described, the combination with a movable member having a receiving surface for gelatinous material, of an open ended spreading device arranged to form a trough or pocket between it and said receiving surface, said spreading device having a covering of soft rubber.

4. In a machine of the character described, the combination with a movable member having a receiving surface for gelatinous material, of an open ended spreading device arranged to form a trough or pocket between it and said receiving surface, said spreading device comprising a non-rotatable roll.

5. In a machine of the character described, the combination with a movable member having a receiving surface for gelatinous material, of an open ended spreading device arranged to form a trough or pocket between it and said receiving surface, said spreading device comprising a non-rotatable roll, bearing blocks in which said roll is mounted, and hangers in which said blocks are mounted, said hangers being pivotally supported, for the purpose specified.

In testimony whereof I affix my signature in the presence of two witnesses.

ASHER O. TRAVIS.

Witnesses:
WM. E. BOULTER,
HENRY M. CONGER.